April 18, 1950 J. K. DOUGLAS 2,504,664
HYDRAULIC DRIVE FOR RECIPROCATING TABLES
Filed March 27, 1948 3 Sheets-Sheet 1

INVENTOR
JAMES K. DOUGLAS
BY
Wesley P. Merrill
ATTORNEY

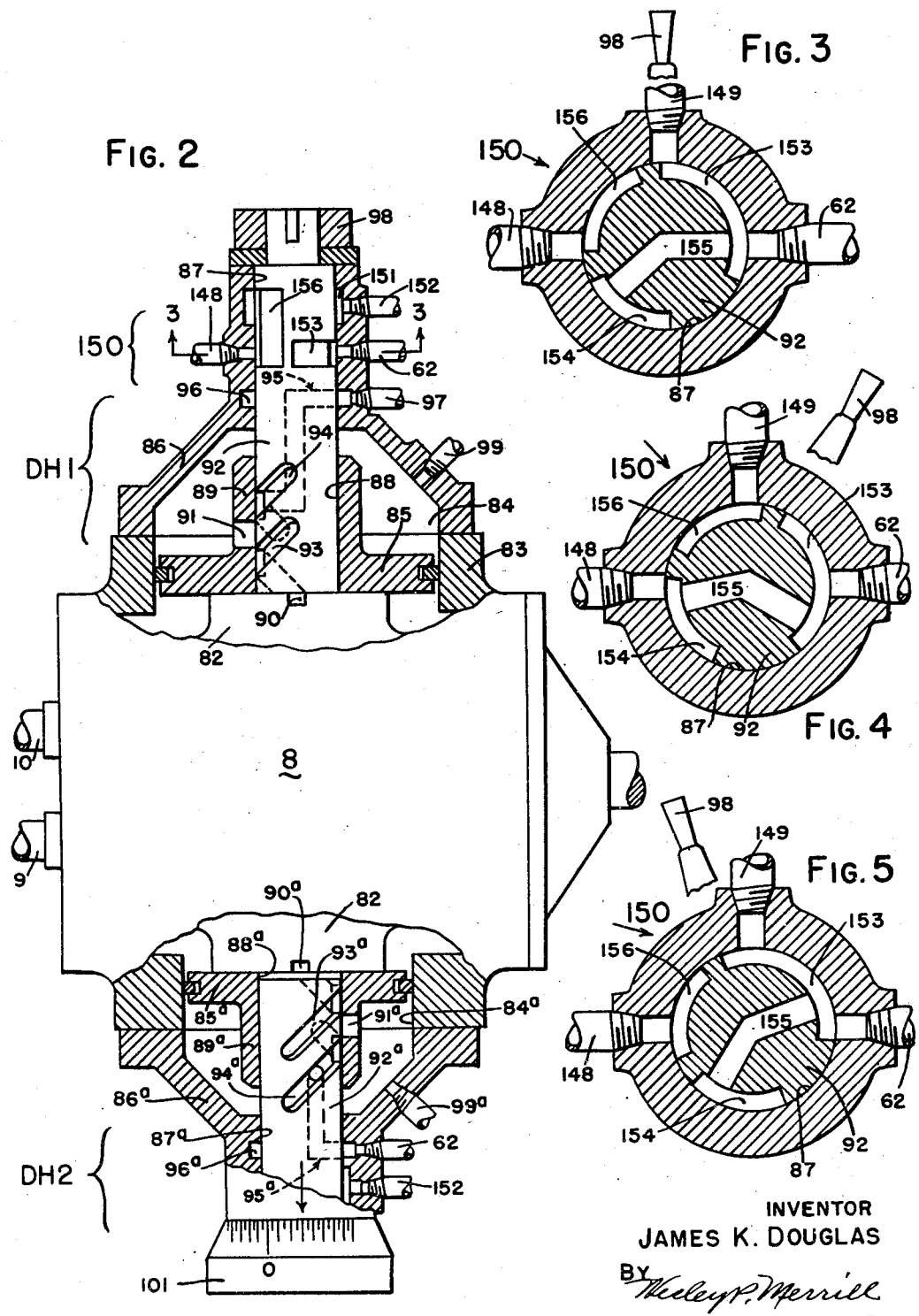

April 18, 1950         J. K. DOUGLAS         2,504,664
HYDRAULIC DRIVE FOR RECIPROCATING TABLES
Filed March 27, 1948                    3 Sheets-Sheet 3
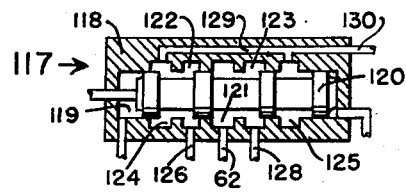
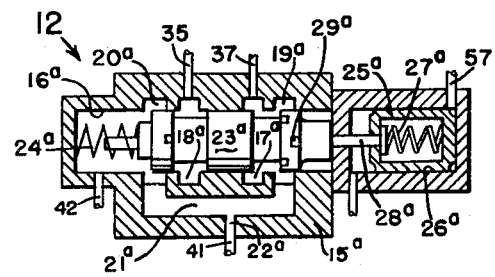
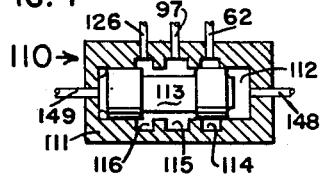
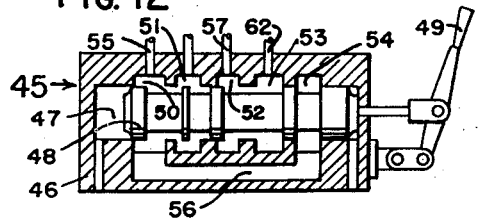
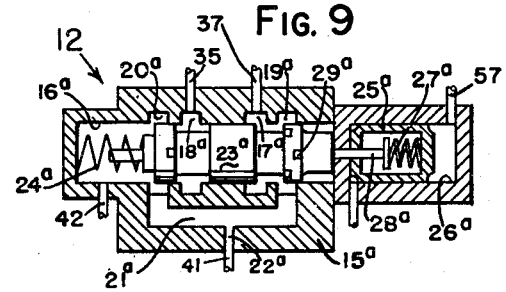
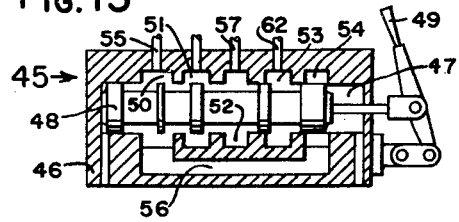
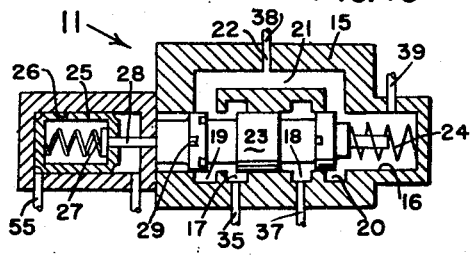
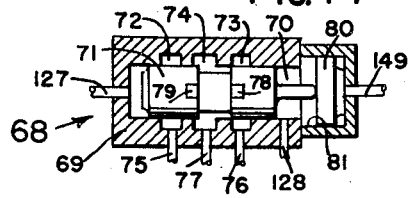
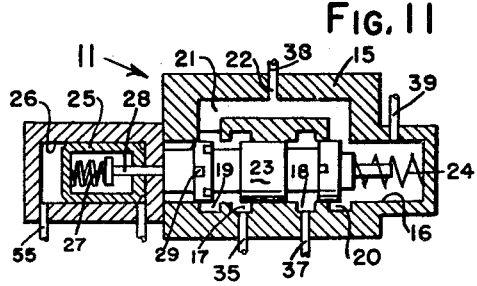
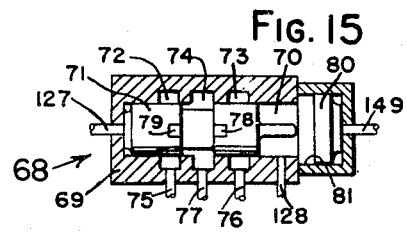
INVENTOR
JAMES K. DOUGLAS
BY
*Wesley P. Merrill*
ATTORNEY Patented Apr. 18, 1950

2,504,664

UNITED STATES PATENT OFFICE 2,504,664

HYDRAULIC DRIVE FOR RECIPROCATING TABLES

James K. Douglas, Shorewood, Wis., assignor to The Oilgear Company, Milwaukee, Wis., a corporation of Wisconsin Application March 27, 1948, Serial No. 17,415

20 Claims. (Cl. 60—52)

This invention relates to hydraulic drives of the type in which a pump and one or more hydraulic motors are connected into a hydraulic circuit and the flow of liquid in the circuit is intermittently reversed to cause the motor or motors to operate in opposite directions alternately.

The type of drive to which the invention relates in particular is adapted to drive a machine in which work is operated upon by a tool in response to relative reciprocation between the tool and the work, such as the drive shown in application Serial No. 6,503 filed February 5, 1948 now Patent No. 2,499,633, of which this application is a continuation in part.

For the purpose of illustration, the invention has been shown embodied in a drive for reciprocating the table or carriage of a planer of the type in which the work to be machined is fastened to the table and a tool or tools carried by a stationary cross-rail takes successive cuts from the work during reciprocation of the table but it is to be understood that the invention is not limited to a drive for such a machine.

The range of reciprocation of a planer table is determined by two dogs which are fastened to the table at spaced apart points and which operate a reversing mechanism at each end of the table stroke so that after being started the table will continue to reciprocate within a fixed range until its movement is stopped or altered by the operator. However, it is necessary at times to move the table beyond its normal range of reciprocation.

In the drive shown in the above application, the table can be started, stopped or reversed, the speed of the table can be varied within a given speed range, and the table can be retracted beyond its normal range of reciprocation by operating a single control element which is arranged at the operator's station. However, the only way to change the speed of the table is to vary the displacement of the pump.

The present invention has as an object to provide a hydraulic drive which has all of the advantages of the drive shown in the above application.

Another object is to provide a hydraulic drive having means for causing the table of a machine to move at selected speeds within any one of a plurality of speed ranges.

Another object is to provide a hydraulic drive having means for preventing or reducing rebound of the table due to the table jumping ahead in response to the load on the motor being suddenly eliminated or greatly reduced.

Other objects and advantages of the invention will appear from the following description of a hydraulic drive in which the invention is embodied.

The drive is shown schematically in the accompanying drawings in which the views are as follows:

Fig. 2 is in part a top plan view and in part a sectional plan view of the pump shown in Fig. 1, the pump control being drawn on a larger scale than the pump proper.

Fig. 3 is a cross-section taken on the line 3—3 of Fig. 2 but drawn to a larger scale.

Figs. 4 and 5 are views similar to Fig. 3 but showing the valve member in positions different from that shown in Fig. 3.

Fig. 6 is a view showing a mechanically operated valve with its plunger in a position different from that shown in Fig. 1.

Fig. 7 is a view showing a hydraulically operated valve with its plunger in a position different from that shown in Fig. 1.

Figs. 8 and 9 are views showing a speed selector valve with its parts in positions different from those in Fig. 1.

Figs. 10 and 11 are views showing another speed selector valve with its parts in positions different from those shown in Fig. 1.

Figs. 12 and 13 are views showing a speed selector pilot valve with its plunger in positions different from that shown in Fig. 1.

Figs. 14 and 15 are views showing a circuit unlocking valve with its parts in position different from those shown in Fig. 1.

Figure 1:
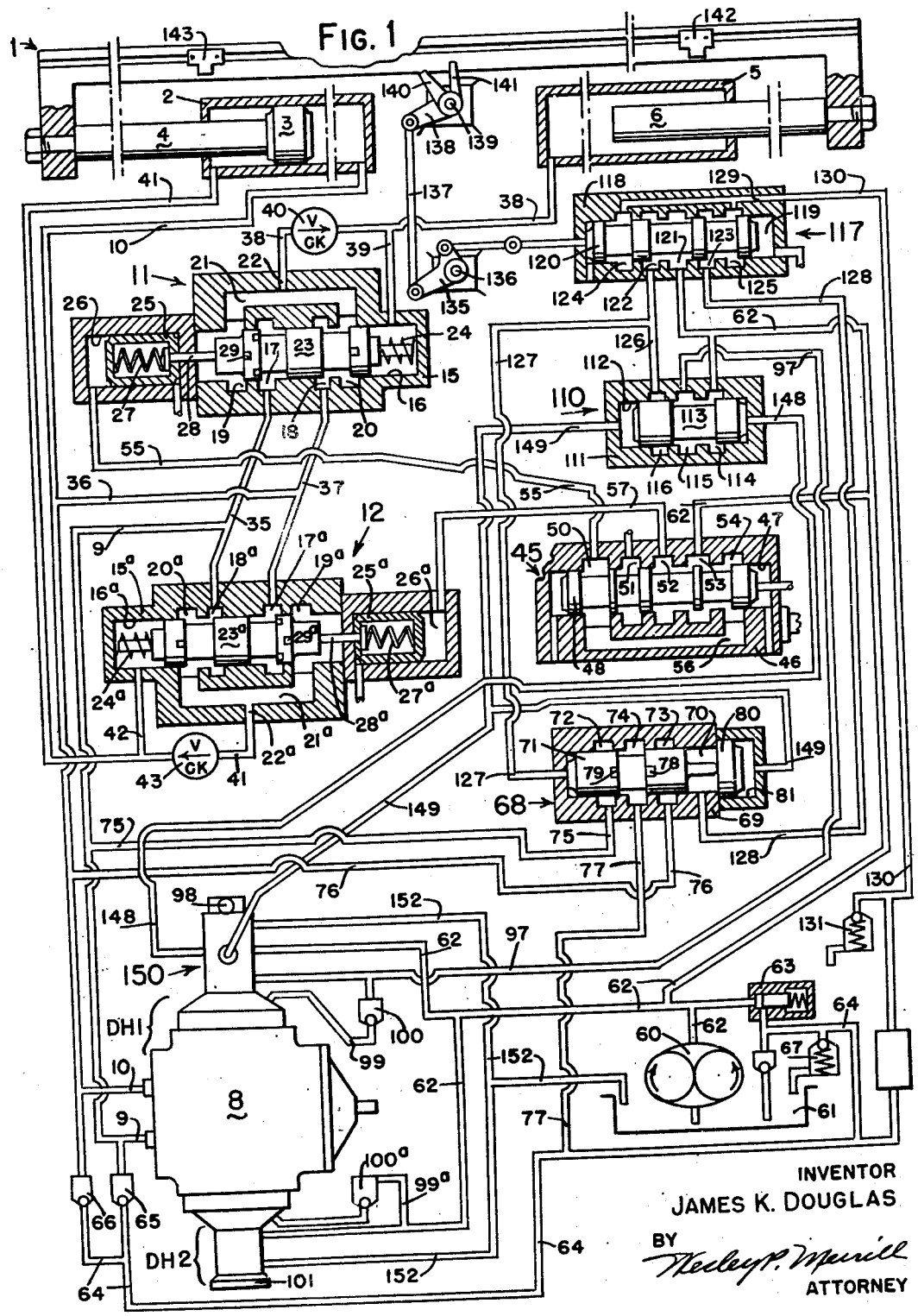
Fig. 1 is a diagram illustrating the fuctional relationship of the parts which are shown in different planes in order that all hydraulic connections may be illustrated, the parts being shown in the positions occupied when the drive is idle.

For the purpose of illustration, the drive has been shown as being employed to reciprocate the table 1 of a planer of conventional type. Since such planers are well known and form no part of the present invention, only the table has been illustrated.

Table 1 is adapted to be reciprocated by a hydraulic motor having a plurality of effective pressure areas. For example, table 1 may be reciprocated by a double-acting motor having a stationary cylinder 2 and a ram consisting of a piston 3 fitted in cylinder 2 and a piston rod 4 connecting piston 3 to the left end of table 1. With such a motor, table 1 would be moved toward the left at slow speed when the right end of cylinder 2 was supplied with liquid from a pump and the left end of cylinder 2 was connected to exhaust, it would be moved toward the left at a higher speed when both ends of cylinder 2 were supplied with liquid from the pump, and it would be moved toward the right when the left end of cylinder 2 was supplied with liquid from the pump and the right end thereof was connected to exhaust.

However, when the table was being moved toward the left, the pump would have to draw part or all of its liquid from a reservoir which is objectionable if a cut is being taken from work in response to movement of the table toward the left. Therefore, the present invention provides an additional stationary cylinder 5 and a ram 6 which extends into cylinder 5 and is connected to the right end of table 1. It is to be understood that ram 3—4 and ram 6 could be fixed in stationary positions and cylinders 2 and 5 be fastened to table 1 which would be an equivalent of the structure shown.

The arrangement is such that when liquid is supplied from a pump to the left ends of cylinders 2 and 5 and the right end of cylinder 2 is connected to the intake of the pump, table 1 will be moved toward the right at a slow speed by the liquid acting upon the end of ram 6 and upon the annular area of piston 3 around rod 4. Piston 3 will eject liquid from the right end of cylinder 2 and the ejected liquid will flow to the intake of the pump.

When liquid is supplied from a pump to cylinder 5 and both ends of cylinder 2 are connected to each other and to the intake of the pump, table 1 will be moved toward the right at high speed by the liquid acting upon the end of ram 6 and piston 3 will eject liquid from the right end of cylinder 2. A part of the ejected liquid will flow to the left end of cylinder 2 to keep it flooded and the remainder of the ejected liquid will flow to the intake of the pump.

When liquid is supplied from a pump to the left end of cylinder 2 and cylinder 5 and the right end of cylinder 2 are connected to each other and to the intake of the pump, table 1 will be moved toward the right at an intermediate speed by the liquid acting upon the annular area of piston 3 around rod 4 and piston 3 will expel liquid from the right end of cylinder 2. A part of the expelled liquid will flow to cylinder 5 to keep it flooded and the remainder of the expelled liquid will flow to the intake of the pump.

When liquid is supplied from a pump to the right end of cylinder 2, the left end of cylinder 2 is connected to the right end thereof and cylinder 5 is connected to the intake of the pump, table 1 will be moved toward the left at high speed by liquid acting upon an area of piston 3 equal to the cross-sectional area of rod 4 and the liquid ejected by piston 3 from the left end of cylinder 2 will flow to the right end thereof so that the pump need supply only a volume of liquid equal to the displacement of rod 4. The liquid ejected by ram 6 from cylinder 5 will flow to the intake of the pump.

Table 1 may thus be moved toward the right on a cutting stroke at either a high speed, a low speed or an intermediate speed by selecting a ram upon which the liquid acts and each of those speeds may be varied by varying the displacement of the pump.

If piston rod 4 and ram 6 have the same cross-sectional area, the volume of liquid returned from the motor to the pump is equal to the volume of liquid discharged by the pump except for the very small volume lost through slip. That is, the small decrease in volume due to leakage and to the compression of the liquid when under pressure.

The hydraulic motor is adapted to be energized by motive liquid supplied thereto by a pump 8 which is continuously driven when the drive is in operation and which has two channels 9 and 10 connected thereto. Pump 8 may be a unidirectional pump and the flow of liquid between the pump and motor may be reversed through a reversing valve but preferably the flow is reversed by reversing the pump.

The liquid discharged by pump 8 is directed to the pressure area on one side or the other of piston 3 or to the pressure area on ram 6 or to a combination of those areas under the control of two speed selector valves 11 and 12.

Valve 11 includes a valve body 15 having an axial bore 16 formed therein and four annular grooves or ports 17, 18, 19 and 20 formed in the wall of bore 16. Ports 19 and 20 are connected to each other by a passage 21 which is formed in valve body 15 and terminates in a port 22.

The flow of liquid through valve body 15 is controlled by a valve or plunger 23 which is fitted in bore 16 and urged toward the left by light spring 24 arranged in the right end of bore 16. Plunger 23 is adapted to be moved toward the right by a hollow piston 25 which is fitted in a cylinder 26 arranged upon the left end of body 15.

Motion is transmitted from piston 25 to plunger 23 by means of a spring 27, which is arranged within piston 25, and a push rod 28 which has one end in engagement with spring 27 and its other end in engagement with plunger 23. Spring 27 has sufficient strength to move plunger 23 toward the right against the resistance of spring 24.

The right end of cylinder 26 is open to drain at all times and the left end thereof is adapted to be supplied with motive liquid or to be connected to drain selectively as will presently be explained. When the left end of cylinder 26 is open to drain, spring 24 will move plunger 23 to its left-hand position as shown in Fig. 10 and then liquid may flow from port 17 to port 22. When the left end of cylinder 26 is supplied with motive liquid, piston 25 will move plunger 23 to its right-hand position as shown in Fig. 1 and then liquid may flow from port 18 to port 22. When piston 25 is holding plunger 23 to the right and liquid under pressure is supplied to the right end of bore 16, the liquid can move plunger 23 to its left-hand position against the resistance of spring 27 as shown in Fig. 11 and then the liquid can flow from the right end of bore 16 through port 17.

In order that springs 24 and 27 may shift plunger 23 from one to the other of its two positions, the left-hand piston on plunger 23 is provided with one or more slots 29 which permit liquid to escape from the left end of bore 16 during the last part of the movement of plunger 23 toward the left and through which pressure can extend into the left end of bore 16 to hydrostatically balance plunger 23 when it is in its left-hand position as shown in Fig. 10.

Valve 12 has been shown turned end for end in respect to valve 11 but the two valves are identical and they function in the same manner. Therefore, like parts have been indicated by like reference numerals with the exponent "a" added to the reference numerals applied to valve 12 so that the foregoing description will suffice for both valves.

Port 17 of valve 11 is connected to port 18ª of valve 12 by a channel 35 which is connected by channel 9 to one port of pump 8. Channel 10 connects the other port of pump 8 to the right end of cylinder 2 and it is connected intermediate its ends by a channel 36 to a channel 37 which connects port 18 of valve 11 to port 17ª of valve 12.

Port 22 of valve 11 is connected to cylinder 5 by a channel 38 which is connected by a channel 39 to the right end of bore 16. A check valve 40 is arranged in channel 38 between port 22 and channel 39 to permit flow from port 22 into channel 38 and to prevent flow in the opposite direction. Port 22ª of valve 12 is connected to the left end of cylinder 2 by a channel 41 which is connected by a channel 42 to the left end of bore 16ª. A check valve 43 is arranged in channel 41 between port 22ª and channel 42 to permit flow from port 22ª into channel 41 and to prevent flow in the opposite direction.

The left end of cylinder 26 on valve 11 and the right end of cylinder 26ª on valve 12 are adapted to be supplied with motive liquid or to be connected to drain selectively under the control of a manually operable pilot valve 45 which includes a valve body 46 having an axial bore 47 formed therein and a valve or plunger 48 fitted in bore 47 and adapted to be shifted from one to the other of three positions by a hand lever 49 connected thereto.

Plunger 48 controls communication between five annular grooves or ports 50, 51, 52, 53 and 54 which are formed in the wall of bore 47. Port 50 is connected to the left end of cylinder 26 by a channel 55 and it is connected to port 54 by a passage 56 formed in body 46. Port 51 is connected to drain at all times. Port 52 is connected to the right end of cylinder 26ª by a channel 57. Port 53 is supplied at all times with motive liquid as presently will be explained.

Liquid for effecting operation of valves 11 and 12 and for other purposes is supplied by a gear pump 60 which draws liquid from a reservoir 61 and discharges it into a branched supply channel 62 which has one branch thereof connected to port 53 of pilot valve 45. Gear pump 60 and reservoir 61 have been shown separate from pump 8 in order that the hydraulic circuit may be clearly illustrated but in practice gear pump 60 is driven in unison with pump 8 and it is arranged within the casing thereof which ordinarily is mounted directly upon reservoir 61.

One branch of channel 62 is connected to the inlet of a relief valve 63 having the outlet thereof connected to a channel 64 which is connected to channels 9 and 10 through two check valves 65 and 66 respectively. Gear pump 60 discharges liquid at a rate in excess of requirements and a part of this liquid is discharged through relief valve 63 which opens at a predetermined pressure, such as 200 p. s. i., and enables gear pump 60 to maintain that pressure in channel 62. Some of the liquid discharged into channel 64 is exhausted through a relief valve 67 which is connected to channel 64 and discharges into reservoir 61. Relief valve 67 is adjusted to open at a somewhat lower pressure, such as 180 p. s. i., and thereby causes gear pump 60 to supercharge pump 8 at that pressure.

When the hydraulic motor is moving table 1 to cause work fastened thereon to be operated upon by a cutting tool, the pressure created by the pump to enable the motor to move the table compresses the liquid in the working chamber or chambers of the motor. Then when the tool suddenly breaks out of the cut, the compressed liquid expands and causes the motor ram and the table to jump ahead and liquid to be expelled from the discharge chamber or chambers of the motor into channel 10 faster than it can enter pump 8.

If no means were provided for permitting escape of liquid expelled into channel 10 in excess of the liquid which can enter pump 8, the inertia of the table would cause the liquid in the discharge chamber or chambers to be compressed and, when the table reached the end of a jump, the compressed liquid would expand and cause the table to rebound, thereby setting up an oscillating movement of the table which is very undesirable.

In order to avoid rebound of the table, the present invention provides a circuit unlocking valve 68 including a valve body 69 having an axial bore 70 and a valve plunger 71 fitted in bore 70 to control communication between three annular grooves or ports 72, 73 and 74 which are formed in the wall of bore 70. Port 72 is connected to channel 9 by a channel 75, port 73 is connected to channel 10 by a channel 76 and port 74 is connected to gear pump channel 64 by a channel 77.

Plunger 71 has one or more slots 78 formed therein to provide restricted communication between port 73 and port 74 when it is in the position shown in Fig. 14. Plunger 71 also has formed therein one or more slots 79 which provide restricted communication between port 72 and port 74 when plunger 71 is in the position shown in Fig. 1 but which are blocked when plunger 71 is in the position shown in Fig. 14.

Plunger 71 is adapted to be moved to the position shown in Fig. 14 by liquid supplied to the left end of bore 70 and it is adapted to be moved to the position shown in Fig. 1 either by liquid supplied to the right end of bore 70 or by a piston 80 fitted in a cylinder 81 which is arranged upon the right end of body 69 and adapted to be supplied with motive liquid or to be connected to drain as will presently be explained.

The arrangement is such that, when table 1 is moving toward the right on a cutting stroke, pump 8 is discharging liquid into channel 9 and plunger 71 is in its right hand position so that slots 79 are blocked to prevent escape of motive liquid from channel 9. If table 1 should jump ahead due to any cause such as the tool breaking out of the cut, liquid will be expelled from the motor cylinders into the return side of the circuit in excess of the volume which can enter pump 8 and at least a part of this excess liquid will flow through slots 78 and channel 77 into the gear pump circuit, thereby preventing the pressure in the return side of the main circuit from becoming high enough to cause the table to rebound at the end of the jump.

When pump 8 is adjusted to neutral, no liquid will be delivered thereby but if its displacement varying member should wander slightly from its neutral position it will wander in a direction to cause pump 8 to discharge liquid into channel 9 at a minute rate. However, at that time plunger 71 is in the position shown in Fig. 1 so that any limited discharge of liquid by pump 8 will escape through slots 79 and channel 77 into the gear pump circuit and thereby prevent table 1 from creeping due to pump 8 not being exactly at zero displacement.

Pump 8 may be of any suitable type but it has been indicated as being of the general type shown in Patent No. 2,227,814. Since such pumps are well known and in extensive use, it is deemed sufficient to state herein that the pump has its pumping mechanism arranged within a displacement varying member or slideblock 82 (Fig. 2) which is arranged within the casing 83 of the pump, that pump displacement will be zero when the slideblock 82 is in its central or neutral position, and that the pump will deliver liquid in a direction and at a rate dependent upon the direction and distance slideblock 82 is shifted from its neutral position.

Slideblock 82 is continuously urged upward in respect to the drawing, as will presently be explained, and it is adapted to be moved downward or permitted to be moved upward in response to operation of a control which is illustrated in Fig. 2 and is arranged upon the upper side of the pump in respect to that figure.

This control includes a cylinder 84, which is formed in the sidewall of pump casing 83, and a piston 85 which engages slideblock 82 and is fitted in cylinder 84 to form therewith a servomotor for shifting slideblock 82 downward. Cylinder 84 is closed at its outer end by a head 86 having a bore 87 formed therein in axial alignment with a bore 88 which extends through piston 85 and through an extension or hub 89 formed upon the outer face of piston 85. The inner end of bore 88 communicates at all times with the interior of casing 83 as by means of a slot 90 formed in slideblock 82.

Liquid is adapted to flow into and out of cylinder 84 through a port 91 which extends through the wall of hub 89 into communication with bore 88. Port 91 is controlled by a rotary valve member 92 which is closely fitted in bores 87 and 88 and has two spiral grooves 93 and 94 formed in its peripheral surface at opposite sides of port 91 and spaced apart a distance equal to the diameter of port 91.

One end of groove 93 extends to the end of valve member 92 so that groove 93 is at all times in communication with the inner end of bore 88. Groove 94 communicates with one end of an internal passage 95 which extends through valve member 92 and has its other end in communication with an annular groove 96 which is formed in the wall of bore 87. Groove 96 communicates with a channel 97 which is fastened to head 86 and is adapted to be supplied with motive liquid at a substantially constant pressure as will presently be explained.

Valve member 92 is adapted to be rotated by a lever 98 which is fixed to the outer end thereof and also restrains valve member 92 from axial movement. In order to simplify the drawing, lever 98 has been shown as being manually operable which would necessitate arranging pump 8 near the operator's station alongside table 1 so that lever 98 would be within reach of the operator but in practice pump 8 is arranged in a move convenient location and lever 98 is connected by linkage to a manually operable lever which is arranged at the operator's station and provided with means for retaining it in any adjusted position.

The arrangement is such that, when channel 97 is supplied with motive liquid and groove 94 registers with port 91, liquid may flow from channel 97 through groove 96, passage 95, groove 94 and port 91 into cylinder 84 and, when groove 93 registers with port 91, liquid may escape from cylinder 84 through port 91, groove 93, the inner end of bore 88 and slot 90 into pump casing 83.

In order that liquid may be permitted to escape from cylinder 84 independently of valve member 92, the interior of cylinder 84 is connected to channel 97 by a channel 99 having arranged therein a check valve 100 which permits liquid to flow from cylinder 84 into channel 97 but prevents flow of liquid from channel 97 into cylinder 84 except through valve member 92.

The pump control thus far described is in extensive use and is known commercially as a "DH" control. Therefore, the control as an entirety has been designated by the reference character DH1.

In order for a DH control to function, the slideblock must be urged toward it by a spring or other means such as a simple hydraulic servo-motor which is continuously supplied with liquid at a constant pressure as shown in Patent 2,227,814. In the present instance however slideblock 82 is urged toward control DH1 by a second DH control which has been designated by the reference character DH2 and which is the same as control DH1 except that its cylinder 84ª and piston 85ª are smaller than cylinder 84 and piston 85, its valve member 92ª is provided on its outer end with a knob 101 for rotating it to adjusted positions and its groove 96ª has a branch of gear pump supply channel 62 connected thereto so that it is continuously supplied with liquid at a substantially constant pressure. Therefore, like parts have been indicated by like reference numerals with the exponent "a" added to the reference numerals applied to the parts of control DH2 and further description thereof will not be given. Knob 101 ordinarily is provided with suitable graduations to indicate the angular position of valve member 92ª.

Before starting the drive in operation, knob 101 is so adjusted that groove 94ª is open to port 91ª when slideblock 82 is in its neutral position so that the pressure of the liquid in channel 62 can extend therefrom through groove 96ª, passage 95ª, groove 94ª and port 91ª into cylinder 84ª and cause piston 85ª to urge slideblock 82 upward. However, since piston 85ª is smaller than piston 85, it cannot move slideblock 82 upward as long as liquid is supplied to or trapped in cylinder 84 but it will move slideblock 82 upward when cylinder 84 is connected to exhaust.

Then when channel 97 is supplied with motive liquid and lever 98 is swung toward the right from its neutral position to rotate valve member 92 clockwise in respect to Fig. 3, groove 94 will open to port 91 and liquid will flow from channel 97 through groove 96, passage 95, groove 94 and port 91 into cylinder 84 and cause piston 85 to move slideblock 82 downward in respect to the drawing.

It should be mentioned at this point that grooves 93 and 94 are not true spirals but each consists of two spiral end portions and a short central portion which extends circumferentially of valve member 92 and connects the two spiral portions to each other. The central circumferential portions of the two grooves 93 and 94 are so located that port 91 is between them and is midway between the ends thereof when valve member 92 is in its neutral position.

The arrangement is such that valve member 92 need not be returned exactly to its neutral position in order to cause slideblock 82 to be returned exactly to its neutral position. Consequently, valve member 92 must be rotated through a few degrees in one direction or the other from its neutral position to open groove 93 or groove 94 to port 91 to thereby cause slideblock 82 to be moved in one direction or the other from its neutral position but as soon as one of the grooves opens to port 91 the movement of slideblock 82 will be proportional to the rotary movement of valve member 92.

Moving slideblock 82 below its neutral position causes pump 8 to discharge liquid into channel 9 at a rate proportional to the distance slideblock 82 is moved below its neutral position. Piston 85 will move slideblock 82 downward until port 91 moves out of registry with groove 94 to cut off flow of liquid to cylinder 84 and thereby stop further movement of slideblock 82. Therefore, the distance that slideblock 82 is moved below its neutral position and the rate at which pump 8 discharges liquid into channel 9 is determined by the position of control lever 98.

Piston 85a will move downward with slideblock 82 and it will eject liquid from its cylinder 84a either through port 91a, groove 94a, passage 95a and groove 96a into channel 62 or through channel 99a and check valve 100a into channel 62 until port 91a moves out of registry with groove 94a and then it will eject liquid from cylinder 84a through channel 99a and check valve 100a into channel 62.

When channel 97 is disconnected from the source of motive liquid and connected to a low pressure exhaust as will presently be explained, liquid will flow from channel 62 through groove 96a, passage 95a, groove 94a and port 91a into cylinder 84a and cause piston 85a to move slideblock 82 upward in respect to the drawing.

Moving slideblock 82 above its neutral position causes pump 8 to discharge liquid into channel 10 at a rate proportional to the distance slideblock 82 is moved above its neutral position. Piston 85a will move slideblock 82 upward until port 91a moves out of registry with groove 94a to cut off flow of liquid to cylinder 84a and thereby stop further movement of slideblock 82. Therefore, the distance that slideblock 82 is moved above the neutral position is proportional to the angular distance through which knob 101 is moved from its neutral position and the rate at which pump 8 discharges liquid into channel 10 is determined by the position of knob 101. Piston 85 will move upward with slideblock 82 and it will eject liquid from cylinder 84 through channel 99, check valve 100 and channel 97 to exhaust.

When channel 97 is supplied with motive liquid and lever 98 is swung toward the left from its neutral position to rotate valve member 92 counterclockwise in respect to Fig. 3, groove 93 will open to port 91 so that liquid can escape from cylinder 84 through port 91, groove 93, bore 88 and slot 90 into pump casing 83 and thereby permit servo-motor 84a—85a to move slideblock 82 upward until port 91 moves out of registry with groove 93 to cut off further escape of liquid from cylinder 84 or until port 91a moves out of registry with groove 94a and cuts off further flow of liquid into cylinder 84a.

Channel 97 is adapted to be supplied with motive liquid through a hydraulically operated valve 110 which includes a valve body 111 having an axial bore 112 formed therein and a valve or plunger 113 fitted in bore 112 to control communication between three annular grooves or ports 114, 115 and 116 formed in the wall of bore 112. Port 114 has a branch of gear pump supply channel 62 connected thereto and port 115 has channel 97 connected thereto so that control DH1 is continuously supplied with gear pump liquid through channel 97 when plunger 113 is in its right hand position as shown in Fig. 1.

When plunger 113 is in its left hand position as shown in Fig. 7, channel 97 is adapted to be connected to gear pump supply channel 62 and to exhaust alternately by a pilot valve 117 which includes a valve body 118 having an axial bore 119 formed therein and a valve or plunger 120 fitted in bore 119 to control communication between five annular grooves or ports 121, 122, 123, 124 and 125 which are formed in the wall of bore 119.

Port 121 has a branch of gear pump supply channel 62 connected thereto so that it is continuously supplied with liquid from gear pump 60. Port 122 is connected to port 116 of valve 110 by a channel 126 which is connected intermediate its ends by a channel 127 to the left end of bore 70 of valve 68. Port 123 is connected by a channel 128 to the right end of bore 70 in valve 68. Ports 124 and 125 are connected to each other by a passage 129 which is formed in body 118 and is connected by a channel 130 to the inlet of a low pressure relief valve 131 which discharges into reservoir 61 and is adapted to open at a low pressure such as 5 p. s. i.

The arrangement is such that, when valve plunger 113 is in its left hand position as shown in Fig. 7 and valve plunger 120 is in its left hand position as shown in Fig. 1, pressure will extend from gear pump supply channel 62 through valve 117, channel 126, valve 110 and channel 97 to control DH1 to energize it. Pressure will also extend from channel 126 through channel 127 to the left end of bore 70 of valve 68 and, if at that time cylinder 81 is open to drain, plunger 71 will be moved toward the right and will expel liquid from the right end of bore 70 through channel 128, valve 117, channel 130 and relief valve 131 into reservoir 61.

When valve plunger 113 is in its left hand position as shown in Fig. 7, moving valve plunger 120 to its right hand position as shown in Fig. 6 establishes communication between channel 97 and exhaust channel 130 and thereby permits piston 85a of control DH2 to move pump slideblock 82 upward and cause piston 85 of control DH1 to eject liquid from cylinder 84 through channel 99, check valve 100, channel 97, valve 110, channel 126, valve 117, channel 130 and relief valve 131 which resists the discharge of liquid therethrough and thereby prevents slideblock 82 from overrunning when movement of piston 85a ceases. Also, liquid will flow from gear pump supply channel 62 through valve 117 and channel 128 to the right end of bore 70 in valve 68 and cause plunger 71 to move toward the left and eject liquid from the left end of bore 70 through channels 127 and 126, valve 117, channel 130 and relief valve 131.

Plunger 120 of valve 117 is adapted to be shifted from one to the other of its two positions by a reversing mechanism operable in response to table 1 reaching one end or the other of a predetermined stroke.

The reversing mechanism may assume various forms but, as shown, valve plunger 120 has its stem connected to one arm of a bell crank lever 135 which is pivoted upon a stationary shaft 136 and has its other arm connected by link 137 to one end of a lever 138 having the other end thereof mounted upon a shaft 139 which is arranged in a stationary position. Shaft 139 also has mounted thereon two reversing ears 140 and 141 which are fixed for rotation with lever 138 and have the ends thereof extending into the paths of two dogs 142 and 143 which are fastened to table 1 in adjusted positions.

When dog 142 engages ear 140 during movement of table 1 toward the left, it will cause the reversing mechanism to shift valve plunger 120 to the position shown in Fig. 1 and, when dog 143 engages ear 141 during movement of table 1 toward the right, it will cause the reversing mechanism to shift valve plunger 120 to the position shown in Fig. 6. Thus, when the drive is operating, table 1 normally reciprocates within a fixed range as determined by the positions of dogs 142 and 143.

It is necessary at times to move table 1 beyond its normal range of reciprocation for the purpose of replacing or inspecting the work upon table 1. In order that this may be accomplished without further adjustment of the dogs or the reversing ears, plunger 113 of valve 110 must be shifted to the position shown in Fig. 1 to prevent pilot valve 117 from effecting operation of pump control DH1, and servo-motor 80—81 should shift plunger 71 of valve 68 to the position shown in Fig. 1 to prevent bypassing any of the liquid discharged by pump 8 into channel 10.

Valve plunger 113 is adapted to be shifted in one direction or the other by liquid delivered to one end or the other of bore 112 through one or the other of two channels 148 and 149 which are connected to opposite ends of body 111. A branch of channel 149 is connected to cylinder 81 on valve 68 so that, when liquid is supplied thru channel 149 to shift plunger 113 to the position shown in Fig. 1, servo-motor 80—81 will be energized and will shift valve plunger 71 to the position shown in Fig. 1. The flow of liquid through channels 148 and 149 is under the control of a valve 150 which is operable in unison with control lever 98.

Valve 150 may be an individual valve which is connected to lever 98 to be operated thereby. However, in order to provide a compact control, valve 150 preferably is provided by forming ports and passages in cylinder head 86 and in valve member 92 of control DH1 but functionally it is just as independent of control DH1 as if it were a separate structure.

As shown in Figs. 2–5, channels 148 and 149 and a branch of gear pump supply channel 62 are connected to head 86 and communicate with bore 87 in a plane situated between port 96 and an annular groove or drain port 151 which is formed in the wall of bore 87 and communicates with a channel 152 which discharges into reservoir 61. Channel 62 is adapted to be connected to channel 148 and 149 selectively by two circumferential grooves 153 and 154 which are formed in the peripheral surface of valve member 92 and are connected to each other by an internal passage 155 formed in valve member 92. Drain port 151 is adapted to be connected to channels 148 and 149 alternately by a circumferential groove 156 which is formed in the peripheral surface of valve member 92 between the adjacent ends of grooves 153 and 154 and is wide enough to communicate with port 151. The portions of valve member 92 and head 86 axially outward from port 96 thus constitute valve 150.

The arrangement is such that, when lever 98 is moved to its neutral position as shown in Fig. 3 or is swung toward the left beyond its neutral position as shown in Fig. 5, groove 153 will communicate with channel 149 and groove 156 will communicate with channel 148 so that liquid can flow from channel 62 through groove 153 and channel 149 to valve 110 and cause its plunger 113 to move toward the right and to eject liquid from the right end of bore 112 through channel 148 and groove 156 into drain port 151. Also, liquid will flow through the branch of channel 149 to cylinder 81 and cause piston 80 to move valve plunger 71 to the position shown in Fig. 1.

When lever 98 is swung toward the right a predetermined distance beyond its neutral position as shown in Fig. 4, groove 154 will communicate with channel 148 and groove 156 will communicate with channel 149 so that liquid can flow from channel 62 through groove 153, passage 155, groove 154 and channel 148 to valve 110 and cause its plunger 113 to move toward the left and to eject liquid from the left end of bore 112 through channel 149 and groove 156 into drain port 151.

OPERATION

Assuming that table 1 has been moving toward the right at medium speed and that control lever 98 has been returned to its neutral position to cause control DH1 to adjust pump 8 to neutral and thereby stop table 1, the plungers of the several valves will be in the positions shown in Fig. 1.

With both pumps running, any liquid which might be discharged by pump 8 will be discharged thru channel 9 and be bypassed through valve 68, and gear pump 60 will be discharging through relief valves 63 and 67 into reservoir 61. The resistance offered by relief valve 67 enables pump 60 to maintain pressure in both sides of the main circuit to keep it flooded and the resistance offered by relief valve 63 enables gear pump 60 to maintain pressure at both ends of valve 68, to maintain pressure in cylinder 26 to enable piston 25 to hold plunger 23 of valve 11 to the right, to maintain pressure in cylinder 26ª to enable piston 25ª to hold plunger 23ª of valve 12 to the left, and to maintain pressure at the right end of valve 110 to hold plunger 113 to the right.

Operation at medium speed

The drive may be started by swinging lever 98 toward the right from its neutral position to thereby rotate valve member 92 clockwise in respect to Fig. 4. As soon as valve member 92 is rotated through a short angular distance from its neutral position, pressure groove 154 will open to channel 148 and drain groove 156 will open to channel 149, as shown in Fig. 4, which will connect cylinder 81 and the left end of valve 110 to drain and permit gear pump liquid to shift valve plunger 71 of valve 68 to the position shown in Fig. 14 and also permit gear pump liquid to shift plunger 113 of valve 110 to the position shown in Fig. 7 to thereby enable pilot valve 117 to control the flow of liquid to and from control DH1 as previously explained.

As soon as valve member 92 has been rotated far enough to open groove 94 to port 91, gear pump liquid will enter control DH1 and cause it to move slideblock 82 downward in respect to the drawings to a position corresponding to the position of lever 98 and thereby cause pump 8 to discharge liquid into channel 9 as previously explained. The liquid discharged by pump 8 will flow through channels 9 and 35, valve 12, check valve 43 and channel 41 to the rod end of cylinder 2 and cause piston 3 to start table 1 moving toward the right.

The rate at which pump 8 discharges liquid and the rate at which the drive moves table 1 toward the right will gradually increase until movement of control lever 98 toward the right ceases and then table 1 will be moving toward the right on a cutting stroke at a medium speed determined by the position of control lever 98 and the area of piston 3 upon which the liquid acts.

As piston 3 moves table 1 toward the right, it will eject liquid from the right end of cylinder 2 into return channel 10. A part of the ejected liquid will flow from channel 10 through channels 36 and 37, valve 11, check valve 40 and channel 38 to cylinder 5 to keep it flooded as ram 6 moves toward the right with table 1. The remainder of the ejected liquid will flow through channel 10 to the intake of pump 8.

Table 1 will continue to move toward the right until dog 143 operates reversing mechanism 135—141 to shift the plunger 120 of valve 117 to the right to the position shown in Fig. 6 which will disconnect channel 126 from gear pump supply channel 62 and connect it to exhaust channel 130 to thereby enable control DH2 to move slideblock 82 upward and cause pump 8 to discharge liquid into channel 10 at the rate determined by the adjustment of knob 101 as previously explained.

Shifting plunger 120 of valve 117 to the right also connects supply channel 62 to channel 128 so that liquid will flow therethrough to valve 68 and move plunger 71 toward the left to the position shown in Fig. 15 to thereby prevent pump 8 from discharging into the gear pump circuit.

The liquid discharged by pump 8 into channel 10 will flow therethrough to the head end of cylinder 2 and cause piston 3 to move table 1 toward the left on a return stroke.

As table 1 moves toward the left, piston 3 will eject liquid from cylinder 2 into channel 41 and ram 6 will eject liquid from cylinder 5 into channel 38. The liquid ejected by piston 3 into channel 41 will flow therethrough and through channel 42 to the left end of valve 12 and move its plunger 23ª toward the right to the position shown in Fig. 9 and then the liquid will flow through valve 12 and channels 37 and 36 into channel 10 where it joins the liquid discharged by pump 8 so that pump 8 must supply only a volume of liquid equal to the displacement of piston rod 4. Therefore, table 1 will be moved toward the left at a high speed which is determined by the adjustment of pump control DH2 and the area of piston 3 on which the liquid acts.

The liquid ejected by ram 6 into channel 38 will flow therethrough and through channel 39 to the right end of valve 11 and move its plunger 23 toward the left to the position shown in Fig. 11 and then the liquid will flow through valve 11 and channels 35 and 9 to the intake of pump 8.

Table 1 will continue to move toward the left until dog 142 operates reversing mechanism 135—141 to shift the plunger 120 of valve 117 back to the position shown in Fig. 1 which will permit gear pump liquid to flow through channel 127 and shift the plunger 71 of valve 68 to the position shown in Fig. 14 and also permit gear pump liquid to flow through channel 97 to control DH1 and cause its piston 85 to move slideblock 82 downward to the position determined by the position of control lever 98, thereby reversing the flow from pump 8.

As soon as the flow is reversed, spring 27 will move plunger 23 of valve 11 to the position shown in Fig. 1 and spring 27ª will move plunger 23ª of valve 12 to the position shown in Fig. 1. Then the liquid discharged by pump 8 will flow to cylinder 2 and cause piston 3 to move table 1 toward the right as previously explained.

The drive will continue to operate in this manner and table 1 will be moved in opposite directions alternately until hand lever 98 is operated to stop the drive or to retract table 1 beyond its normal range of reciprocation as presently will be explained.

*Operation at low speed*

If the parts are in the positions shown in Fig. 1 and it is desired that the drive be operated within a low speed range, plunger 48 of valve 45 is shifted to the position shown in Fig. 12 to connect cylinder 26 to drain and permit spring 24 to shift plunger 23 of valve 11 to the position shown in Fig. 10.

Then when control lever 98 is moved toward the right from its neutral position as indicated in Fig. 4, the drive will operate in the same manner as when adjusted for operation within a medium speed range and as explained above except that the liquid discharged by pump 8 into channels 9 and 35 will flow therefrom through valve 11 and channel 38 to cylinder 5 in addition to flowing through valve 12 and channel 41 to the rod end of cylinder 2. The liquid discharged by pump 8 will thus act upon the end of ram 6 in addition to acting upon the left side of piston 3 so that table 1 will be moved toward the right at a low speed determined by the position of control lever 98 and the total ram and piston area upon which the liquid acts.

As table 1 moves toward the right, piston 3 will eject liquid from cylinder 2 and the ejected liquid will flow through channel 10 to the intake of pump 8.

Table 1 will move toward the right at low speed until dog 143 operates reversing mechanism 135—141 to effect reversal and then table 1 will move toward the left at high speed until dog 142 operates reversing mechanism 135—141 to cause table 1 to again move toward the right as explained above. Table 1 will continue to reciprocate in this manner until the drive is stopped or its operation altered by the operator.

*Operation at high speed*

If the parts are in the positions shown in Fig. 1 and it is desired that the drive be operated within a high speed range, plunger 48 of valve 45 is shifted to the position shown in Fig. 13 to connect cylinders 26 and 26ª to drain and permit springs 24 and 24ª to shift valve plungers 23 and 23ª to the positions shown in Figs. 8 and 10 respectively.

Then when control lever 98 is moved toward the right from its neutral position as indicated in Fig. 4, the drive will operate in the same manner as when adjusted for operation within a medium speed range and as explained above except that the liquid discharged by pump 8 into channels 9 and 35 will flow therefrom through valve 11 and channel 38 to cylinder 5 and cause ram 6 to move table 1 toward the right at a high speed determined by the position of control lever 98 and the area of ram 6.

As table 1 moves toward the right, piston 3 will eject liquid from the head end of cylinder 2 into channel 10. A part of the ejected liquid will flow from channel 10 through channels 36 and 37, valve 12, check valve 43 and channel 41 to the rod end of cylinder 2 to keep it flooded and the remainder of the ejected liquid will flow through channel 10 to the intake of pump 8.

Table 1 will move toward the right at high speed until dog 143 operates reversing mechanism 135—141 to effect reversal and then table 1 will move toward the left at high speed until dog 142 operates reversing mechanism 135—141 to cause table 1 to again move toward the right as explained above. Table 1 will continue to reciprocate in this manner until the drive is stopped or its operation altered by the operator.

*Manual control*

The movements of table 1 may be removed from under the control of pilot valve 117 and brought under the control of the operator at any time by merely moving control lever 98 toward its neutral position until port 153 opens to channel 149 and port 156 opens to channel 148 which will cause gear pump liquid to flow from channel 62 through valve 150 and channel 149 to valve 110 and move its plunger 113 to the position shown in Fig. 1 so that control DH1 is continuously supplied with gear pump liquid.

If lever 98 is a substantial distance toward the right from its neutral position and pilot valve plunger 120 is in the position shown in Fig. 1 so that table 1 is moving toward the right, moving lever 98 toward the left will open groove 93 to port 91 (Fig. 2) to permit piston 85ª to move slideblock 82 upward and thereby reduce the displacement of pump 8 and consequently decelerate table 1 at a rate proportional to the rate at which lever 98 is moved but if pilot valve plunger 120 is in the position shown in Fig. 6 so that table 1 is moving toward the left, channel 97 will be open to exhaust channel 130 and table 1 will continue to move toward the left until dog 142 operates the reversing mechanism to shift pilot valve plunger 120 to the position shown in Fig. 1 or until lever 98 has been moved far enough to cause plunger 113 of valve 110 to be shifted to the position shown in Fig. 1. Thereafter, the displacement of pump 8 and the movement of table 1 are solely under the control of lever 98 as long as lever 98 is not moved far enough toward the right to open groove 156 to channel 149 and groove 154 to channel 148.

If it is desired to retract table 1 beyond its normal range of reciprocation, lever 98 may be moved toward the left from its neutral position which will cause pump 8 to discharge liquid into channel 10 and table 1 to move toward the left at a rate determined by the position of lever 98 as previously explained. As table 1 moves toward the left, dog 142 will operate the reversing mechanism to shift pilot valve plunger 120 which will have no effect at this time for the reason that valve plunger 113 is in the position shown in Fig. 1 so that control DH1 is continuously supplied with motive liquid.

Control lever 98 thus may be operated to start, stop and reverse the table, to move the table in either direction, to cause the table to reciprocate continuously within a predetermined range, to change the speed of the table and to move the table to a desired position outside that range.

The hydraulic drive described herein may be modified in various ways without departing from the scope of the invention which is hereby claimed as follows:

1. In a machine having an element adapted to be moved in one or the other of two directions selectively, the combination of hydraulic motor means connected to said element and having three pressure chambers of different capacities, a pump for supplying motive liquid to said motor means to energize the same, channel means connecting said pump and said motor means and forming therewith a hydraulic circuit, valve means arranged in said circuit and shiftable to different positions to cause liquid to flow from said pump to either one of the two smaller of said chambers and liquid to flow from the largest one of said chambers to the other one of the two smaller of said chambers or to cause liquid to flow from said pump to both of the two smaller of said chambers and liquid to flow from the largest one of said chambers to said pump to thereby cause said motor means to move said element in one direction at any one of three different speeds, means for reversing the flow in said circuit to thereby cause said motor means to move said element in the opposite direction, hydraulic means for shifting said valve means, means for supplying operating liquid to said hydraulic means including a pilot valve for directing said operating liquid to and from said hydraulic means selectively, and means operated by said element during its movement in each direction for effecting operation of said reversing means.

2. In a machine having an element adapted to be moved in one or the other of two directions selectively, the combination of hydraulic motor means connected to said element and having three pressure chambers of different capacities, a pump for supplying motive liquid to said motor means to energize the same, channel means connecting said pump and said motor means and forming therewith a hydraulic circuit, valve means arranged in said circuit and shiftable to different positions to cause liquid to flow from said pump to either one of the two smaller of said chambers and liquid to flow from the largest one of said chambers to the other one of the two smaller of said chambers or to cause liquid to flow from said pump to both of the two smaller of said chambers and liquid to flow from the largest one of said chambers to said pump to thereby cause said motor means to move said element in one direction at any one of three different speeds, means for reversing the flow in said circuit to thereby cause said motor means to move said element in the opposite direction, hydraulic means for shifting said valve means, means for supplying operating liquid to said hydraulic means including a pilot valve for directing said operating liquid to and from said hydraulic means selectively, said valve means being responsive to said reverse flow for directing said motive liquid to a predetermined pressure area of said motor, and means operated by said element during its movement in each direction for effecting operation of said reversing means.

3. In a machine having an element adapted to be moved in opposite directions selectively, the combination of hydraulic motor means which includes a first cylinder having a piston fitted therein and connected to said element by a piston rod and a second cylinder having a ram extending into it and connected to said element, a pump, fluid channels connecting said pump to said motor means and forming therewith a hydraulic circuit, and valve means arranged in said circuit and adapted to connect said pump either to said second cylinder or to the rod end of said first cylinder or to both said second cylinder and the rod end of said first cylinder to cause said motor means to advance said element at any one of three different speeds or upon reversal of flow in said circuit to connect said pump to both ends of said first cylinder to cause said motor means to retract said element at high speed.

4. In a machine having an element adapted to be moved in one or the other of two directions selectively, the combination of hydraulic motor means connected to said element and having a plurality of pressure areas, a pump for supplying motive liquid to said motor means to energize the same and having hydraulic means for varying its displacement, a source of operating liquid, means for supplying liquid from said source to said hydraulic means including a control valve for directing said liquid thereto and therefrom, channel means connecting said pump and said motor means and forming therewith a hydraulic circuit, valve means arranged in said circuit and shiftable to different positions to direct liquid from said pump to one or more of said pressure areas to thereby cause said motor means to move said element at any one of a plurality of speeds, means for adjusting said valve means to selected positions, hydraulically operated means for reversing the flow in said circuit to thereby effect reversal of said element, means for supplying liquid from said source to said reversing means including a reversing valve for connecting said means to said source and to exhaust alternately to thereby effect reversal of flow in said circuit, means operated by said element during its movement in each direction for effecting operation of said reversing valve, a hydraulically operated valve shiftable from one to the other of two positions to render said reversing valve effective or ineffective to effect operation of said reversing means, means for supplying liquid to said hydraulically operated valve to effect operation thereof including a manually operable valve, and a control element for operating the last mentioned valve and said control valve simultaneously.

5. A hydraulic drive according to claim 4 in which the control valve and the manually operable valve include rotary valve elements which are formed integral with each other and the control element is connected thereto.

6. A hydraulic drive according to claim 4 provided with an unlocking valve which is connected to both sides of said hydraulic circuit and is shiftable from one to the other of two positions in each of which it provides a restricted passage for the escape of liquid from that side of the circuit into which liquid is discharged by the motor means, said unlocking valve being shiftable from one to the other of its two positions in response to said reversing valve being shifted from one to the other of its two positions.

7. A hydraulic drive according to claim 4 in which said motor means includes a first cylinder having a piston fitted therein and connected to said element by a piston rod and a second cylinder having a ram extending into it and connected to said element, and in which said valve means is adapted to connect said pump either to said second cylinder or to the rod end of said first cylinder or to both said second cylinder and the rod end of said first cylinder to cause said motor means to advance said element at any one of three different speeds or upon reversal of flow in said circuit to connect said pump to both ends of said first cylinder to cause said motor means to retract said element at high speed.

8. A hydraulic drive according to claim 4 in which said manually operable valve is effective to cause said hydraulically operated valve to be shifted only when said control valve is adjusted to effect reduction of pump delivery to a predetermined minimum.

9. In a machine having an element adapted to be moved in one or the other of two directions selectively, the combination of hydraulic motor means connected to said element and having a plurality of pressure areas, a pump for supplying motive liquid to said motor means to energize the same and having a member shiftable in opposite directions from a neutral position to vary the rate and direction of pump delivery, channel means connecting said pump and said motor means and forming therewith a hydraulic circuit, valve means arranged in said circuit and shiftable to different positions to direct liquid from said pump to one or more of said pressure areas to thereby cause said motor means to move said element at any one of a plurality of speeds, means for adjusting said valve means to selected positions, a servo-motor for effecting movement of said displacement varying member, a source of operating liquid, means for supplying liquid from said source to said servo-motor including a control valve to direct said liquid thereto and therefrom and a reversing valve for controlling the flow of liquid to said control valve and from said servo-motor and adapted when shifted from one to the other of two positions to cause said servo-motor to shift said displacement varying member and thereby reverse the flow in said circuit, means operated by said element during its movement in each direction for effecting operation of said reversing valve, a hydraulically operated valve shiftable from one to the other of two positions to render said reversing valve effective or ineffective to control said flow of liquid, means for supplying liquid to said hydraulically operated valve to effect operation thereof including a manually operable valve, and a control element for operating the last mentioned valve and said control valve simultaneously.

10. A hydraulic drive according to claim 9 in which the control valve and the manually operable valve include rotary valve elements which are formed integral with each other and the control element is connected thereto.

11. A hydraulic drive according to claim 9 provided with an unlocking valve which is connected to both sides of said hydraulic circuit and is shiftable from one to the other of two positions in each of which it provides a restricted passage for the escape of liquid from that side of the circuit into which liquid is discharged by the motor means, said unlocking valve being shiftable from one to the other of its two positions in response to said reversing valve being shifted from one to the other of its two positions.

12. A hydraulic drive according to claim 9 in which said motor means includes a first cylinder having a piston fitted therein and connected to said element by a piston rod and a second cylinder having a ram extending into it and connected to said element, and in which said valve means is adapted to connect said pump either to said second cylinder or to the rod end of said first cylinder or to both said second cylinder and the rod end of said first cylinder to cause said motor means to advance said element at any one of three different speeds or upon reversal of flow in said circuit to connect said pump to both ends of said first cylinder to cause said motor means to retract said element at high speed.

13. In a machine having an element adapted to be moved in one or the other of two directions selectively, the combination of hydraulic motor means for reciprocating said element, a pump for supplying motive liquid to said motor means to energize the same, channel means connecting said pump and said motor means and forming therewith a hydraulic circuit having two sides each of which functions alternately as a pressure side and a return side, a hydraulically operated unlocking valve arranged outside said circuit and connected to both sides thereof, said unlocking valve being shiftable to two positions in each of which it blocks escape of liquid from the pressure side of said circuit and provides a restricted passage for the escape from the pressure side of said circuit of liquid discharged by said motor means in excess of the liquid which can enter said pump, means for reversing the flow in said circuit to thereby effect reversal of said element, and a hydraulic servo-motor for operating said reversing means, and a pilot valve operated by said element for controlling the operation of both said servo-motor and said unlocking valve.

14. In a machine having an element adapted to be moved in one or the other of two directions selectively, the combination of hydraulic motor means for reciprocating said element, a pump for supplying motive liquid to said motor means to energize the same, channel means connecting said pump and said motor means and forming therewith a hydraulic circuit, means for reversing the flow in said circuit to thereby effect reversal of said element, means for reducing the flow in said circuit to a minimum to thereby decelerate said element to a low speed, an unlocking valve connected to both sides of said circuit and shiftable to two positions in the first of which it provides a restricted passage through which liquid may escape from one side of said circuit and in the second of which it provides a restricted passage through which liquid may escape from the other side of said circuit, means responsive to operation of said reversing means for shifting said unlocking valve from one to the other of its two positions, and other means responsive to operation of said flow reducing means for shifting said unlocking valve to its second position.

15. In a machine having an element adapted to be moved in one or the other of two directions selectively, the combination of hydraulic motor means for reciprocating said element, a pump for supplying motive liquid to said motor means to energize the same, channel means connecting said pump and said motor means and forming therewith a main hydraulic circuit, means for reversing the flow in said circuit to thereby effect reversal of said element, means operated by said element during its movement in each direction for effecting operation of said reversing means, means for reducing the flow in said circuit to a minimum to thereby decelerate said element to a low speed, an auxiliary circuit, means for supplying liquid to said auxiliary circuit at a predetermined pressure, means connecting said auxiliary circuit to both sides of said main circuit to maintain a predetermined back pressure on said motor means and to supercharge said pump, an unlocking valve connected to said auxiliary circuit and to both sides of said main circuit and shiftable to two positions in the first of which it provides a restricted passage through which liquid may escape from one side of said main circuit into said auxiliary circuit and in the second of which it provides a restricted passage through which liquid may escape from the other side of said main circuit into said auxiliary circuit, means responsive to operation of said reversing means for shifting said unlocking valve from one to the other of its two positions, and other means responsive to operation of said flow reducing means for shifting said unlocking valve to its second position.

16. In a machine having an element adapted to be moved in one or the other of two directions selectively, the combination of hydraulic motor means connected to said element and having a plurality of pressure areas, a pump for supplying motive liquid to said motor means to energize the same, channel means connecting said pump and said motor means and forming therewith a hydraulic circuit, valve means arranged in said circuit and shiftable to different positions to direct liquid from said pump to one or more of said pressure areas to thereby cause said motor means to advance said element at any one of a plurality of speeds, hydraulic means for shifting said valve means, means for supplying operating liquid to said hydraulic means including a pilot valve for directing said operating liquid to and from said hydraulic means selectively, an unlocking valve connected to said circuit and adapted in one position to provide a restricted passage for the escape from said circuit of liquid discharged by said motor means in excess of the liquid which can enter said pump, means for reversing the flow in said circuit to thereby effect reversal of said element, and means responsive to operation of said reversing means for shifting said unlocking valve to another position.

17. In a machine having an element adapted to be moved in one or the other of two directions selectively, the combination of hydraulic motor means for reciprocating said element, a pump for supplying motive liquid to said motor means to energize the same and having hydraulic means for varying its displacement, a source of operating liquid, means for supplying liquid from said source to said hydraulic means including a control valve for directing said liquid thereto and therefrom, channel means connecting said pump and said motor means and forming therewith a hydraulic circuit, means for reversing the flow in said circuit to thereby effect reversal of said element, means operated by said element during its movement in each direction for effecting operation of said reversing means, an unlocking valve connected to both sides of said circuit and shiftable to two positions in the first of which it provides a restricted passage through which liquid may escape from one side of said circuit and in the second of which it provides a restricted passage through which liquid may escape from the other side of said circuit, means responsive to operation of said reversing means for shifting said unlocking valve from one to the other of its two positions, a servo-motor for shifting said unlocking valve to its second position, means for supplying liquid from said source to said servo-motor including a manually operable valve for directing said liquid thereto and therefrom, and a control element for operating the last mentioned valve and said control valve simultaneously.

18. A hydraulic drive according to claim 17 in which the control valve and the manually operable valve include rotary valve elements which are formed integral with each other and the control element is connected thereto.

19. In a machine having an element adapted to be moved in one or the other of two directions selectively, the combination of hydraulic motor means connected to said element and having a plurality of pressure areas, a pump for supplying motive liquid to said motor means to energize the same, channel means connecting said pump and said motor means and forming therewith a hydraulic circuit, means for reversing the flow in said circuit to thereby effect reversal of said element, means operated by said element during its movement in each direction for effecting operation of said reversing means, two valves arranged in said circuit for directing liquid from said pump to one or more of said pressure areas selectively to thereby cause said motor means to move said element at any one of a plurality of speeds, each of said valves including a valve body having a bore, a valve plunger fitted in said bore and a light spring in one end of said bore for moving said plunger in one direction, a servo-motor arranged at the other end of said bore and adapted when energized to move said plunger in the opposite direction, a spring stronger than said light spring arranged in said servo-motor for permitting said plunger to move in said one direction when said servo-motor is energized and the end of said bore containing said light spring is supplied with liquid at a pressure higher than the pressure in the other end of said bore, a source of operating liquid, and means including a pilot valve for connecting the servo-motors on both of said valves to said source and to exhaust selectively.

20. A hydraulic drive according to claim 19 in which the plunger of each of said valves has upon the end thereof adjacent said servo-motor a piston adapted to enter the end portion of said bore and provided with a slot through which liquid may escape from said end of said bore when said plunger is moved in said one direction and through which pressure may extend to equalize the pressures on opposite ends of said plunger.

JAMES K. DOUGLAS.

REFERENCES CITED

The following references are of record in the file of this patent:

UNITED STATES PATENTS

| Number | Name | Date |
|---|---|---|
| 1,843,082 | Ferris et al. | Jan. 26, 1932 |
| 1,983,900 | Ferris et al. | Dec. 11, 1934 |
| 2,000,805 | West et al. | May 7, 1935 |
| 2,005,018 | West et al. | June 18, 1935 |
| 2,114,005 | Tyler | Apr. 12, 1938 |
| 2,157,240 | Keel | May 9, 1939 |
| 2,160,217 | Kingsbury | May 30, 1939 |
| 2,271,615 | Bauer | Feb. 3, 1942 |
| 2,345,919 | Davis | Apr. 4, 1944 |
| 2,353,791 | Shartle | July 18, 1944 |
| 2,382,452 | Svenson | Aug. 14, 1945 |
| 2,389,829 | Tyler | Nov. 27, 1945 |
| 2,397,395 | Wiedmann | Mar. 26, 1946 |